(12) United States Patent
Avalos Vega et al.

(10) Patent No.: US 10,896,407 B2
(45) Date of Patent: *Jan. 19, 2021

(54) COGNITIVE ADAPTATION TO USER BEHAVIOR FOR PERSONALIZED AUTOMATIC PROCESSING OF EVENTS

(71) Applicant: International Business Machines Corporation, Armonk, NY (US)

(72) Inventors: Juan Manuel Avalos Vega, Zapopan (MX); Adolfo Mendez Morales, Tlajomulco (MX); Jesus Gabriel Trillo Vargas, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 637 days.

This patent is subject to a terminal disclaimer.

(21) Appl. No.: 15/596,277

(22) Filed: May 16, 2017

(65) Prior Publication Data

US 2018/0336531 A1 Nov. 22, 2018

(51) Int. Cl.
*G06Q 10/10* (2012.01)
(52) U.S. Cl.
CPC .................. *G06Q 10/1095* (2013.01)
(58) Field of Classification Search
None
See application file for complete search history.

(56) References Cited

U.S. PATENT DOCUMENTS

| | | |
|---|---|---|
| 8,375,034 B2 | 2/2013 | Norton et al. |
| 8,745,141 B2 | 6/2014 | Rosenberg et al. |
| 8,832,205 B2 | 9/2014 | Nelson et al. |
| 8,863,021 B1 | 10/2014 | Bee |

(Continued)

FOREIGN PATENT DOCUMENTS

WO 2009099435 A1 8/2009

OTHER PUBLICATIONS

Malkiel, "Productivity: the problem behind the headlines", Harvard Business Review, Journal Article, May 1, 1979. SciTech Connect, last accessed Mar. 20, 2017. 1 page. https://www.osti.gov/scitech/biblio/6014369.

(Continued)

*Primary Examiner* — Stephanie Z Delich
(74) *Attorney, Agent, or Firm* — Jay Wahlquist

(57) ABSTRACT

Cognitive adaptation to user behavior which enables a system to automatically process an event according to a user's personalized preferences. An example computer implemented method of processing new events comprises receiving a new event for a user's calendar; extracting event information from the new event, the event information corresponding to user-defined criteria, wherein each of the user-defined criteria is associated with a respective user-defined weight; comparing the extracted event information with user-defined values associated with the user-defined criteria; computing an acceptance score for the new event based on the comparison of the extracted event information with the user-defined values and on the respective user-defined weights; comparing the acceptance score to a first user-defined threshold; and in response to determining that the acceptance score is equal to or greater than the first user-defined threshold, automatically accepting the new event and scheduling the new event on the user's calendar.

20 Claims, 7 Drawing Sheets

(56) References Cited

U.S. PATENT DOCUMENTS

| | | |
|---|---|---|
| 9,143,832 B2 | 9/2015 | Newell et al. |
| 9,146,962 B1 | 9/2015 | Boe |
| 2003/0115188 A1 | 6/2003 | Srinivasa |
| 2008/0033778 A1 | 2/2008 | Boss et al. |
| 2009/0165022 A1 | 6/2009 | Madsen |
| 2010/0293029 A1 | 11/2010 | Olliphant |
| 2014/0019059 A1 | 1/2014 | Shankle et al. |
| 2014/0164945 A1 | 6/2014 | Junqua et al. |
| 2015/0058873 A1 | 2/2015 | Newell et al. |
| 2015/0347983 A1 | 12/2015 | Jon |
| 2016/0203442 A1 | 7/2016 | Pererira |
| 2016/0255466 A1 | 9/2016 | Shuster et al. |
| 2016/0267439 A1 | 9/2016 | Bitran et al. |
| 2016/0275458 A1 | 9/2016 | Meushar et al. |
| 2017/0193459 A1 | 7/2017 | Crasso |
| 2017/0236097 A1 | 8/2017 | Smith |
| 2017/0308866 A1 | 10/2017 | Dotan-Cohen |
| 2017/0372271 A1 | 12/2017 | Goldsmith |

OTHER PUBLICATIONS

Mankins, "Stop Wasting Valuable Time", Harvard Business Review, Sep. 2004. 6 pages. Last accessed Mar. 20, 2017. https://hbr.org/2004/09/stop-wasting-valuable-time.

Unknown, "Enroll in the Calendar.help preview and let Cortana schedule your meetings", Office 365, Dec. 13, 2016, last accessed May 15, 2017. 5 pages. https://hbr.org/2004/09/stop-wasting-valuable-time.

Mell, et al., "The NIST Definition of Cloud Computing", Recommendations of the National Institute of Standards and Technology, Sep. 2011. 7 pages.

Accelerated Examination Support Document, U.S. Appl. No. 15/848,238, Dec. 12, 2017, 26 pgs.

Avalos Vega, et al., "Cognitive Adaptation to User Behavior for Personalized Automatic Processing of Events," U.S. Appl. No. 15/848,238, filed Dec. 20, 2017.

List of IBM Patents or Patent Applications Treated as Related, Dec. 19, 2017, 2 pgs.

COGNITIVE ADAPTATION TO USER BEHAVIOR FOR PERSONALIZED AUTOMATIC PROCESSING OF EVENTS

BACKGROUND

Wasting time planning agendas is a common issue, from businesses to families. For companies, a misuse of time management can impact productivity and, thus, have a financial impact. People typically organize their time using agendas and scheduling events (such as working hours, meetings, appointments, holidays, etc.) based on prior planning and free time. Conventional calendars only show if the time you want to save is free or is already occupied for another activity.

SUMMARY

Aspects of the disclosure may include a computer implemented method, computer program product, and system for processing and scheduling new calendar events. The method comprises receiving a new calendar event for a user's calendar; extracting event information from the new calendar event, the event information corresponding to user-defined criteria, wherein each of the user-defined criteria is associated with a respective user-defined weight; comparing the extracted event information with user-defined values associated with the user-defined criteria; computing an acceptance score for the new calendar event based on the comparison of the extracted event information with the user-defined values and on the respective user-defined weights; comparing the acceptance score to a first user-defined threshold; and in response to determining that the acceptance score is equal to or greater than the first user-defined threshold, automatically accepting the new calendar event and scheduling the new calendar event on the user's calendar.

The above summary is not intended to describe each illustrated embodiment or every implementation of the present disclosure.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
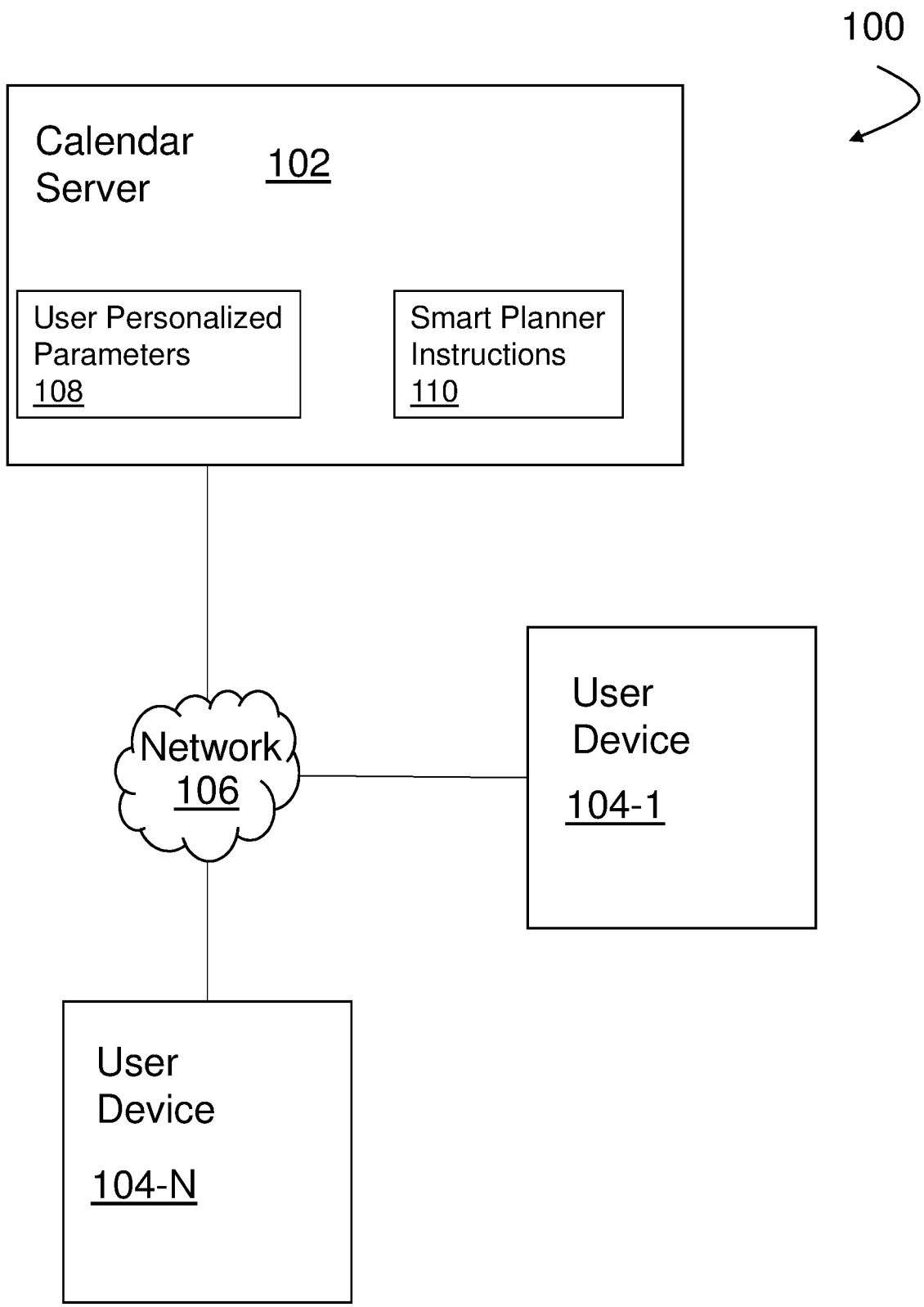
FIG. 1 is a block diagram of one embodiment of an example calendaring system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate" and "compute," and variations thereof, as used herein, are used interchangeably and include any type of methodology, process, mathematical operation or technique. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

FIG. 1 is a block diagram of one embodiment of an example calendaring system 100. The calendaring system 100 includes a server 102 which is coupled to a plurality of user devices 104-1 . . . 104-N via a network 106. Each of the user devices 104 can be implemented as any device capable of displaying a calendar with events. For example, each of the user devices 104 can be implemented as a desktop computer, portable computer, laptop or notebook computer, netbook, tablet computer, pocket computer, smart phone, or any other suitable type of electronic device capable of displaying a calendar with events. It is to be understood that all of the user devices 104 do not need to be implemented the same. Furthermore, it is to be understood that, although only two user devices 104 are shown for purposes of explanation, more than two user devices can be used in other embodiments.

The user devices are communicatively coupled to the server 102 via the network 106. The network 106 can be implemented by any number of any suitable communications topologies (e.g., wide area network (WAN), local area network (LAN), Internet, Intranet, etc.). The communications network 106 can include one or more servers, networks, or databases, and can use a particular communication protocol to transfer data between the user devices 104 and the calendar server 102. The communications network 106 can include a variety of types of physical communication channels or "links." The links can be wired, wireless, optical, or any other suitable media. In addition, the communications network 102 can include a variety of network hardware and software for performing routing, switching, and other functions, such as routers, switches, or bridges. Furthermore, it is to be understood that although user device 104-1 and user device 104-N are depicted in the example of FIG. 1 as being communicatively coupled to the server 102 via the same network 106, for purposes of illustration, the user devices 104 can be coupled to the server 102 via separate networks, in other embodiments. For example, in some embodiments, user device 104-1 can be communicatively coupled to the calendar server 102 via a local area network while the user device 104-N is communicatively coupled to the server 102 via the internet.

The calendar server 102 is configured to execute smart planner instructions 110 which enable the calendar server 102 to adapt to each user's respective preferences to provide personalized recommendations/actions for helping a user improve time management. In particular, the calendar server 102 enables each user to create or modify a profile to include a set of personalized parameters include one or more objects or criteria, such as, but not limited to, time of day, day of the week, length of meeting, topic, people involved, etc. The personalized parameters also include specific values for each of the criteria. For example, a user may specify the example value of between 10 AM to 1 PM for the criteria "time of day." By specifying this example time period, the user has identified that the user prefers to have meetings during that time period. Similarly, a user can specify preferred days of the week in the "day of the week" criteria.

In addition, the user can assign weights to each of the criteria to thereby indicate the relative importance of each criteria for that specific user. For example, day of the week may be more important to an example user than time of day. Thus, that user could assign a higher weight to the "day of the week" criteria than to the "time of day" criteria. There are many ways of assigning weights to indicate relative importance. For example, each criteria may be given a value on a scale of numbers such as 1-10 with one end of the scale being the highest weight (e.g. 1) and the other being the lowest weight (e.g. 10). Alternatively, weights can be expressed as percentages of a total value. For example, one criteria be assigned a weight of 60% and another a weight of 40% so that the total of the respective weights is 100%. It is to be understood that these examples of assigning weights are provided by way of example only and that any technique for assigning relative importance or value to the respective criteria can be implemented in the various embodiments. The calendar stores each user's personalized parameters 108 for later use. For example, each user's personalized parameters 108 can be stored together with that user's credentials, such as username, password, etc.

When a calendar event, such as a meeting request, is received for a given user, the calendar server 102 analyzes the calendar event based on that user's personalized parameters. Based on that analysis, the calendar server 102 can determine an action to take to aid the user. For example, the calendar server 102 can automatically accept the calendar event, automatically reject the calendar event, or request further input from the given user, as described in more detail below. The calendar server 102 is further configured to monitor decisions by the given user's decisions regarding calendar events, such as rejecting, rescheduling, or accepting a calendar event, and can update that user's personalized parameters 108. In this way, the calendar server 102 is able to adapt to and learn the given user's preferences and require less interaction from the given user to take action on new calendar events. An example calendar server is described in more detail below.

Figure 2:
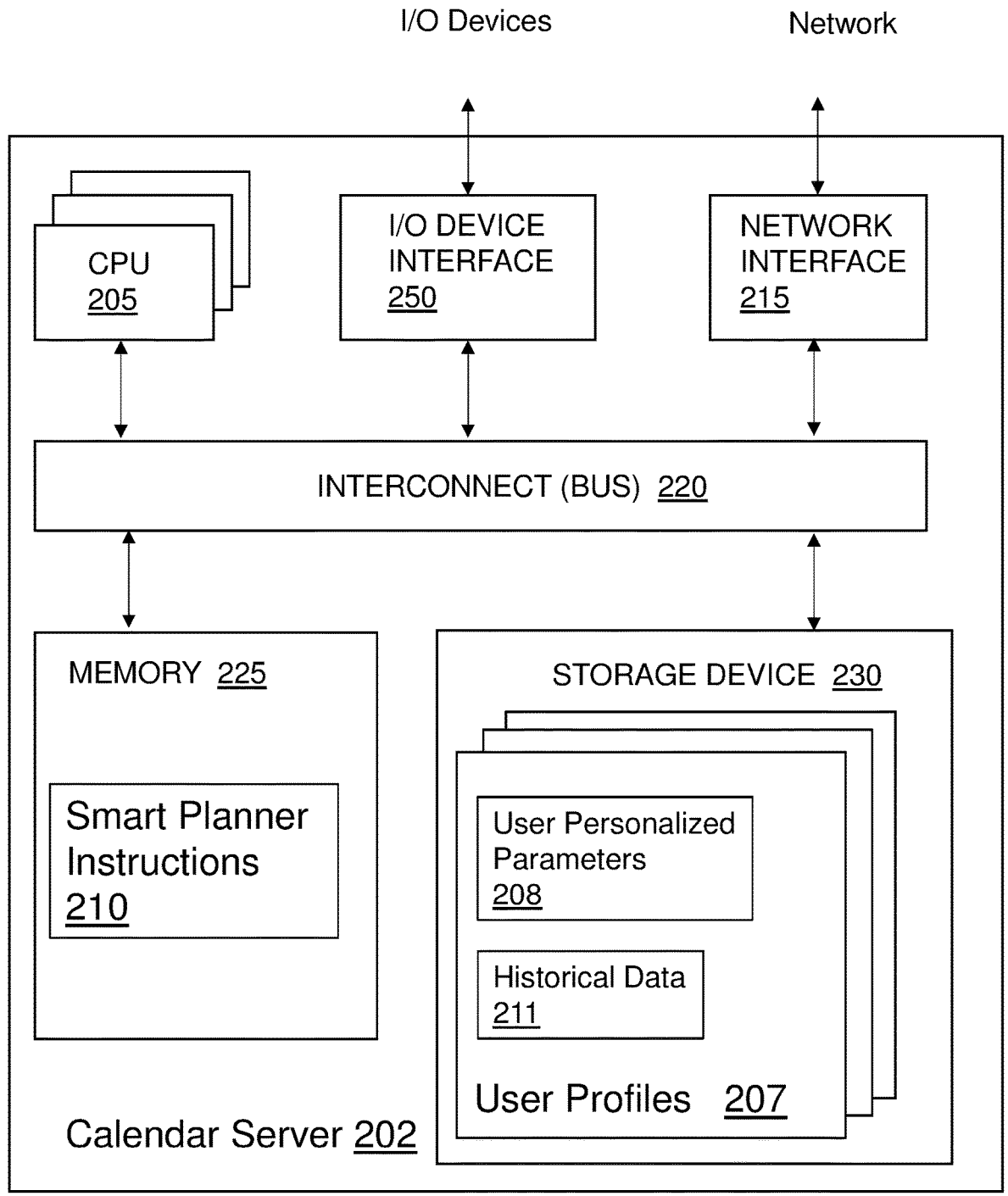
FIG. 2 is a block diagram of one embodiment of an example calendar server.

FIG. 2 is a block diagram of one embodiment of an example calendar server 202. In the example shown in FIG. 2, the calendar server 202 includes a memory 225, storage 230, an interconnect (e.g., BUS) 220, one or more processors 205 (also referred to as CPU 205 herein), an I/O device interface 210, I/O devices 212, and a network interface 215.

Each CPU 205 retrieves and executes programming instructions stored in the memory 225 and/or storage 230. The interconnect 220 is used to move data, such as programming instructions, between the CPU 205, I/O device interface 250, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the calendar server 202 via the I/O device interface 250 or via a communication network coupled to the network interface 215.

In some embodiments, the memory 225 stores smart planner instructions 210 and the storage 230 stores user profiles 207. Each user profile 207 includes user personalized parameters 208 and historical decisions 211. However, in various embodiments, the smart planner instructions 210 and the user profiles 207 are stored partially in memory 225 and partially in storage 230, or they are stored entirely in memory 225 or entirely in storage 230, or they are accessed over a network via the network interface 215.

The smart planner instructions 210 are executed by the CPU 205. When executed, the smart planner instructions 210 cause the CPU 205 to output signals and commands to a user device, such as user devices 104 in FIG. 1, via network 215. The output signals and commands cause the user device to provide a visual and/or audio prompt to request input from the user utilizing the user device. Thus, the user device includes user interface devices such as a display screen, speakers, keyboard, mouse, keypad, touchpad, trackball, buttons, light pen, or other pointing devices. In particular, the prompts direct the user in selecting or otherwise specifying the criteria to be used by the smart planner as well as the weights for each criteria that indicate that user's preferences. The calendar server 202 received the user input from the user device via the network interface 215. These respective user personalized parameters 208 are then stored in the respective user profile 207 for that user.

Some example criteria which are used in some embodiments include, but are not limited to, day of the week, length, start time, people involved, and topic of the event. Each of the criteria can include one or more specific values. In some embodiments, these values can be selected by the user from a list of options. In other embodiments, the user is able to enter values via a free form text box, for example.

For example, the day of the week criteria can contain values identifying one or more days of the week. The values can be the full name of the week, abbreviations or other symbols which identify the respective days of the week. In some embodiments, the day of the week criteria represents the days of the week that are preferred by the user for accepting calendar events. In other embodiments, the day of the week criteria can represent the days of the week that are not preferred by the user for accepting calendar events.

In this embodiment, the length criteria enables a user to input a maximum amount of time that the user prefers for accepting calendar events. The start time criteria enables a user to input the earliest time of day preferred by the user for accepting calendar events. In addition to or in lieu of the start time criteria, an end time criteria can be utilized in some embodiments to enable a user to input a latest end or start time for accepting calendar events. The people involved criteria enables a user to identify preferred individuals for accepting a calendar event. In other words, calendar events involving one or more of the people listed in the people involved criteria are preferred to events not including one or more persons listed in the people involved criteria. In some embodiments, the smart planner instructions 210 access a user contact list and enable the user to select individuals from the list. In other embodiments, a user is able to directly enter contact information, such as an email address or username, of individuals to be included in the people involved criteria. The topic criteria enables a user to enter or select one or more keywords related to preferred topics for accepting calendar events. For example, a user may select keywords such as "Management," "Planning," "Review," etc. to give priority to certain work related meetings as opposed to calendar events for sporting events, such as a baseball game.

It is to be understood that a user's preferences may vary based on the day of the week. For example, a user may have a preference for work related events on week days and for non-work related events on weekends or evenings. Thus, in some embodiments, the calendar server 202 enables a user to specify different criteria for different days of the week. For example, the values assigned to the criteria such as topic, people involved, start time, etc. can be different for different days of the week. In such embodiments, the calendar server retrieves the user personalized parameters corresponding to the day of the week in analyzing a new calendar event.

As discussed above, the smart planner instructions 210 also enable the calendar server 202 to prompt for and store user assigned weights for each criteria. For purposes of explanation, the example calendar server 202 in this embodiment enables a user to assign a percentage to each criteria so that the sum of all the respective percentages is 100 percent. For example, a user could assign a 40% weight to day of the week, a 25% weight to length of the event, a 20% weight to start time, a 10% weight to people involved, and a 5% weight to topic. It is to be understood that the example values above are provided by way of example only and are not meant to be limiting.

When a new event is received for a given user, the smart planner instructions 210 cause the CPU 205 to identify the respective predetermined user-defined criteria values and weights for the given user and to compare the predetermined user-defined criteria values and weights to information extracted from the new calendar event. Based on the comparison, the CPU 205 computes an acceptance score for the new event. For example, if the day of the new calendar event matches one of the values in the day of the week criteria, the length of the new calendar event is less than the maximum length specified in the length criteria and the topic of the new calendar event contains one or more words listed in the topic criteria, then the CPU 205 computes a 70% probability of acceptance for the new calendar event (e.g. 40% for day of the week plus 25% for length plus 5% for topic).

The smart planner instructions 210 then cause the CPU 205 to compare the computed probability with user-defined thresholds. In particular, the calendar server 202 stores within the user-defined parameters 208 for each user, a user specified first threshold and second threshold. By comparing the computed probability to the user-defined thresholds, the calendar server 202 is able to determine different options for responding to the new calendar event, as described in more detail below. In particular, the smart planner instructions 210 store processor executable instructions for various methods such as the methods shown and described hereinafter with respect to FIGS. 3-5.

Figure 3:
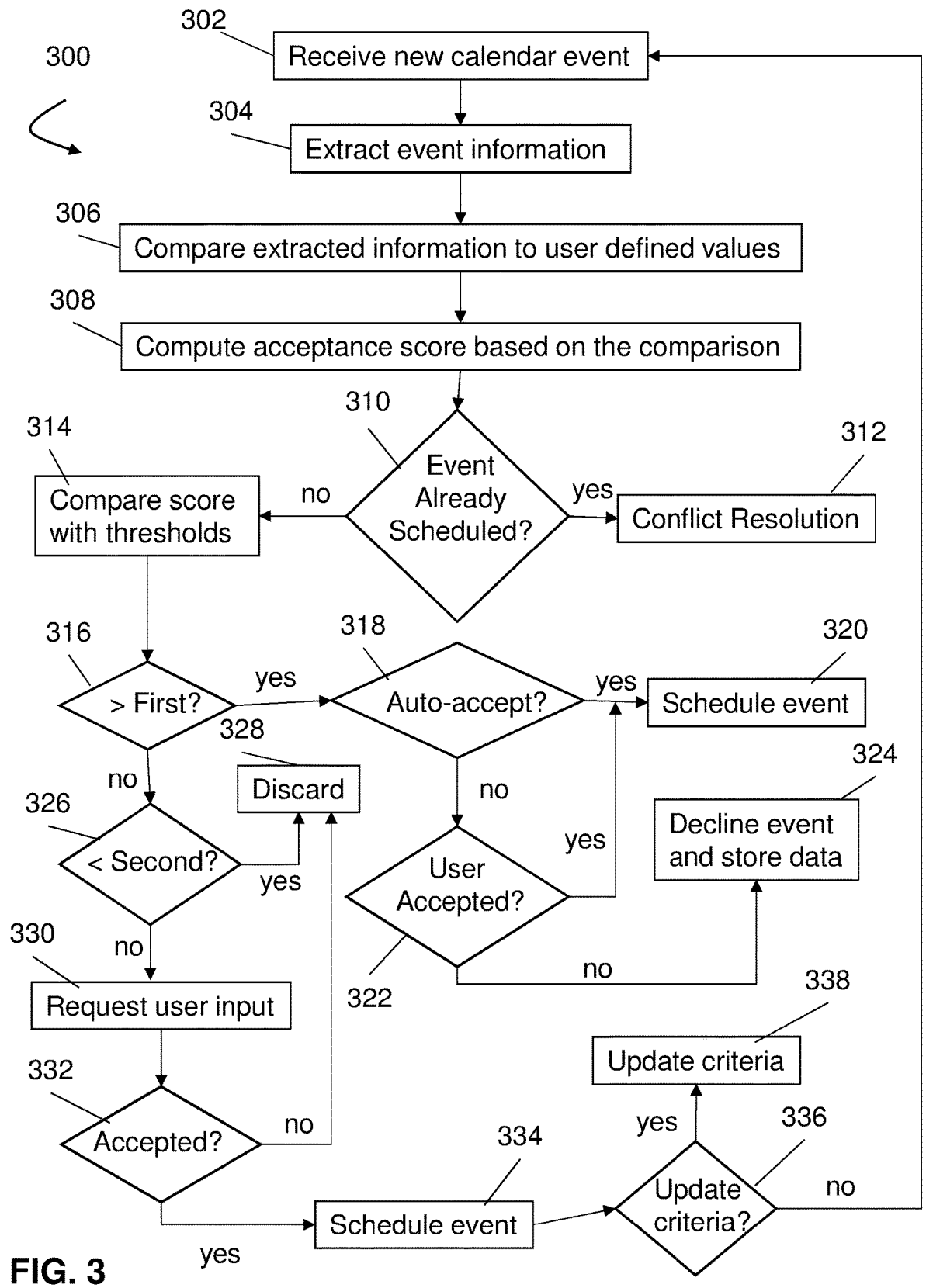
FIG. 3 is a flow chart depicting one embodiment of an example method of processing new calendar events.

FIG. 3 is a flow chart depicting one embodiment of an example method 300 of processing new calendar events. The method 300 can be implemented by a calendar server, such as calendar server 102 or 202 described above. For example, the method 300 can be implemented by a CPU, such as CPU 205 in calendar server 202, executing instructions, such as smart planner instructions 210. It is to be understood that the order of actions in example method 300 is provided for purposes of explanation and that the method can be performed in a different order in other embodiments. Similarly, it is to be understood that some actions can be omitted or additional actions can be included in other embodiments.

At block 302, the calendar server receives a new calendar event. For example, the new calendar event can be received from a user device over a network via a network interface, such as network interface 215. At block 304, the new event is fragmented or broken into parts by the calendar server to extract event information corresponding to the user-defined criteria. For example, data in a date field from the new event can be extracted for comparison to the day of the week criteria. Similarly, values in start and end time fields of the new event can be used to compute a length of the event for comparison with the length criteria. Additionally, the value in the start time fields can also be extracted for comparison with the start time criteria. Values in the source and/or address fields can be used to identify the people involved in the new event. In addition, values in the subject field and/or other text fields, such as the description field, can be extracted for comparison to the topic criteria.

At block 306, the calendar server compares the extracted data from the new event to the user-defined values of the criteria. As described above, the values are compared to find matches between user-defined values of the criteria and the corresponding extracted data from the new calendar event. At block 308, the calendar server computes an acceptance score for the new calendar event based on the comparison at block 306, as described above.

At block 310, the calendar server determines if a calendar event has already been accepted/scheduled which overlaps the day and time of the new calendar event. In other words, it is determined if a conflict exists between the new event and a scheduled event. If a conflict is identified at block 310, the calendar server executes a conflict resolution process at block 312 based on the computed acceptance score. An example embodiment of a method of conflict resolution is described in more detail below with respect to FIG. 4.

If no conflict is identified at block 310, the calendar server compares the computed acceptance score for the new calendar event to a first user-defined threshold and a second user-defined threshold at block 314. In particular, the first and second user-defined thresholds define three zones. The first zone corresponds to acceptance probabilities greater than or equal to the first user-defined threshold. The second zone corresponds to acceptance probabilities between the first and second user-defined thresholds. The third zone corresponds to acceptance probabilities below the second user-defined threshold. Thus, the second user-defined threshold is lower than the first user-defined threshold.

If it is determined that the computed acceptance score is greater than or equal to the first user-defined threshold at block 316, the method 300 continues to block 318. At block 318 the calendar server determines if auto-accept mode is enabled. If auto-accept is enabled, then the calendar server automatically accepts the new calendar event and schedules the new calendar event on the user's calendar at block 320. If auto-accept is not enabled, then the calendar server causes a prompt to be displayed asking the user whether the new calendar event should be accepted at block 322. For example, in some embodiments, a message can be delivered to the user's email inbox providing the user with options to accept, reschedule, or reject the new calendar event. In other embodiments, a pop-up message can be displayed asking the user for input regarding whether to accept the new calendar event. If input received from the user indicates that the new calendar event is accepted, the calendar server schedules the new calendar event on the user's calendar at block 320. If input received from the user indicates that the new calendar event is declined, the calendar server declines the new calendar event at block 324 and stores data regarding the event for possible future use in updating the user-defined criteria. For example, the data regarding the event can be stored in historical data 211.

If the calendar server determines at block 316 that the computed acceptance score is not equal to or greater than the first threshold, the calendar server determines at block 326 if the computed acceptance score is below the second threshold. If the calendar server determines at block 326 that the computed acceptance score is below the second threshold, then the calendar server executes a discard process at block 328. An example method of discarding a calendar event is described in more detail with respect to FIG. 5.

If the calendar server determines at block 326 that the computed acceptance score is not less than the second threshold (i.e. the computed acceptance score is between the first user-defined threshold and the second user-defined threshold), then the calendar server requests input from the user at block 330. For example, a message can be delivered to the user's email inbox or a pop-up message can be displayed requesting input. In some embodiments, the calendar server sends information regarding the new calendar event to the user without modifying the information. However, in other embodiments, the calendar server is configured to analyze the information of the new calendar event to suggest modifications which will increase the acceptance score of the new calendar event. For example, the calendar server calculates the adjustments by analyzing available time on the user's calendar within some time period of the original date in the event request. For example, the calendar server can analyze 3 days before and 3 days after the original requested date to identify available time. It is to be understood that any time period can be used and that 3 days is provided as an example only. Additionally, as used herein, 'available time' refers to time on a calendar for which no event has been scheduled. The calendar server can compare the available times identified near the original request date with the user-defined values of the weighted criteria to identify time slots on the calendar which match or comply with the user-defined values. The calendar server can calculate adjustments to the event length, the event date, the start time of the event, etc. The adjustments are calculated so that, after taking into account the adjustments, the computed acceptance score is increased. In such embodiments, the calendar server provides the suggested modifications to the user with the request for input from the user which enables the user to accept or alter the suggested modifications. In this way, the calendar server is configured, in some embodiments, to provide suggestions to the user on improving time management/productivity based on the user-defined criteria.

If the user input indicates at block 332 that the new calendar event is not accepted, the calendar server executes the discard process at block 328. If the user input indicates at block 332 that the new calendar event is accepted, the calendar server schedules the new calendar event on the user's calendar at block 334. If suggestions were provided to the user at block 330, then the calendar server schedules the new calendar event based on the accepted suggestions. In addition, the calendar server stores data from the accepted new calendar event at block 334. For example, the data from the accepted new calendar event can be stored in historical data 211 associated with the user's profile. At block 336, the calendar server determines if the user-defined criteria should be updated. For example, if the calendar server determines that events having the same acceptance score are accepted a predetermined percentage or number of times despite being less than the first threshold, the calendar server can update the first threshold to be equal to that acceptance score, in some embodiments, so that future events having that acceptance score can be automatically accepted.

Alternatively, the values of the user-defined criteria can be updated. For example, if events from a specific individual are accepted a predetermined number or percentage of time, the calendar server can update the people involved criteria to include that individual. Similarly, the other criteria values, such as topic, day of the week, etc. can also be updated based on the historical decisions of the user. For example, the calendar server can use the data stored in the historical data 211 of FIG. 2. In this way, the calendar server is able to adapt to each user's respective decisions and preferences without relying rigidly on predetermined rules or initial set-up values. This enables the calendar server to learn and reflect changes in a user's preference or circumstances while reducing the amount of interaction required from the user. If the calendar server determines that the user-defined criteria should be updated, the calendar server updates the user-defined criteria at block 338 based on the historical data. If the calendar server determines that the user-defined criteria should not be updated, then the method 300 returns to block 302 to process another new event.

Figure 4:
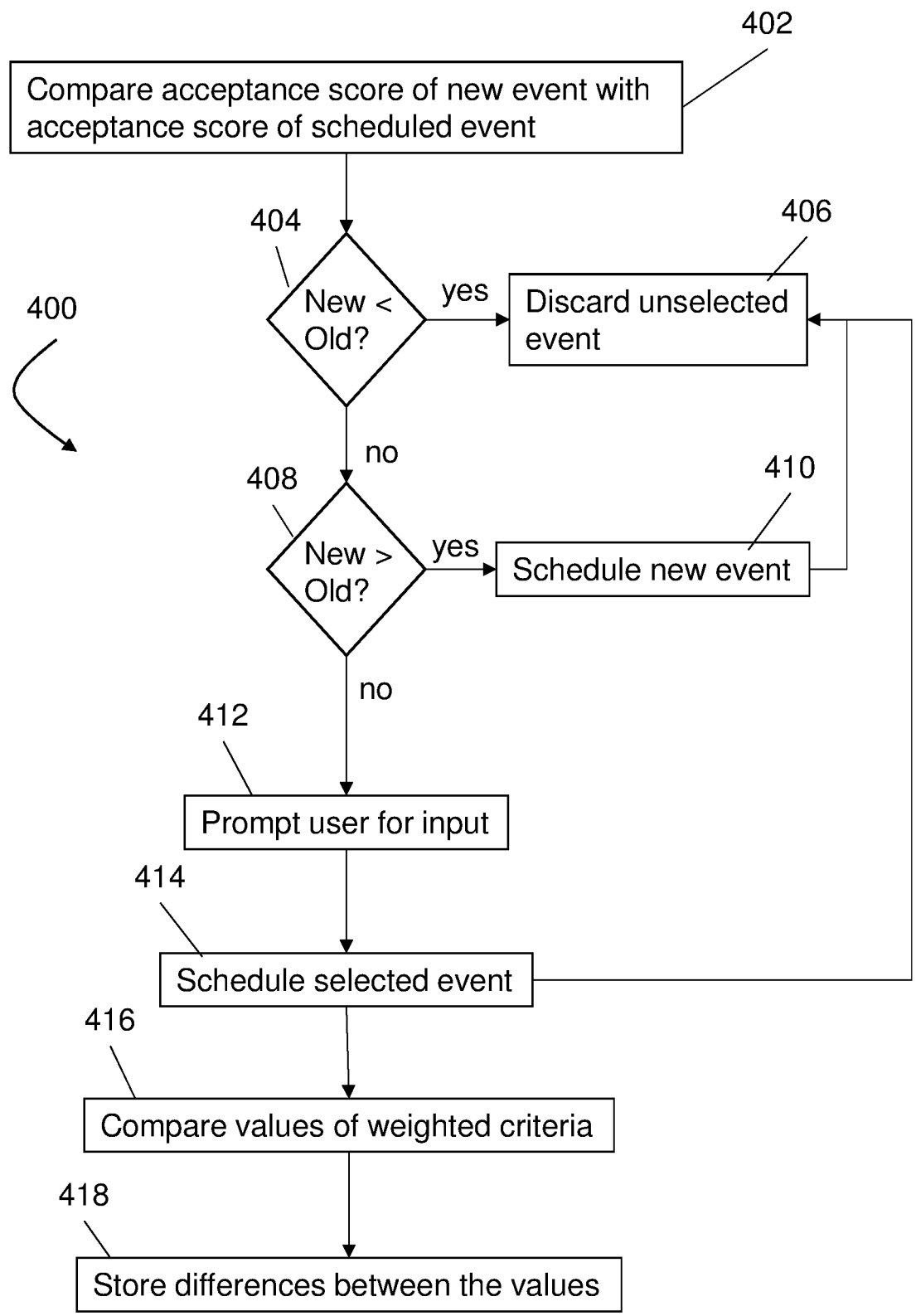
FIG. 4 is a flow chart depicting one embodiment of an example method of conflict resolution.

FIG. 4 is a flow chart of one embodiment of an example method 400 of conflict resolution. The method 400 is one example implementation of the conflict resolution process of block 312 performed on the received new calendar event in method 300. The method 400 can be implemented by a calendar server, such as calendar server 102 or 202 described above. For example, the method 400 can be implemented by a CPU, such as CPU 205 in calendar server 202, executing instructions, such as smart planner instructions 210. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, the calendar server compares the computed acceptance score of the new calendar event with a computed acceptance score of the conflicting scheduled event.

If the calendar server determines at block 404 that the computed acceptance score of the new calendar event is less than the acceptance score of the conflicting scheduled event, then the calendar server executes a discard process on the new calendar event at block 406. An example discard process is described in more detail below with respect to FIG. 5.

If the calendar server determines at block 408 that the computed acceptance score of the new calendar event is greater than the computed acceptance score of the conflicting scheduled event, then the calendar server adds the new calendar event to the calendar at block 410 and executes the discard process on the conflicting scheduled event at block 406.

If the calendar server determines at block 408 that the computed acceptance score of the new calendar event is not greater than the computed acceptance score of the conflicting scheduled event, then the acceptance score of the new calendar event is equal to the computed acceptance score of the conflicting scheduled event. In response to determining that the computed acceptance score of the new calendar event is the same as the computed acceptance score of the conflicting scheduled event, the calendar server causes a prompt to be displayed on the respective user device of the user, at block 412, to request input from the user to decide which event to schedule and which event to send to the discard process. After receiving the user input, the calendar server schedules the selected event at block 414 and executes the discard process on the unselected event at block 406. At block 416, the calendar server compares the values of the weighted criteria corresponding to the user selected event with the values of the weighted criteria corresponding to the event not selected by the user. This comparison enables the calendar server to identify differences between the weighted criteria and/or respective values of the weighted criteria. For example, the non-selected event may not have values associated with one of the criteria, such as the topic criteria, whereas the selected criteria does. Similarly, there may be differences between values of the same criteria. For example, both events may contain individuals in the people involved criteria that are on the user's preferred list. However, the individuals for each event may be different.

At block 418, the calendar server stores the differences between the values of the weighted criteria for the selected and non-selected events. In processing future conflicts between events, the calendar server utilizes the stored differences in identifying which event to schedule and which to discard. For example, in some embodiments, if a subsequent conflict has the same differences as the stored differences, the calendar server automatically selects the event having values for the weighted criteria that match the previous user selected event. Additionally, in some embodiments, if the calendar server detects a pattern after multiple resolved conflicts, the calendar server can automatically update the values and/or the weights of the user-defined criteria.

Figure 5:
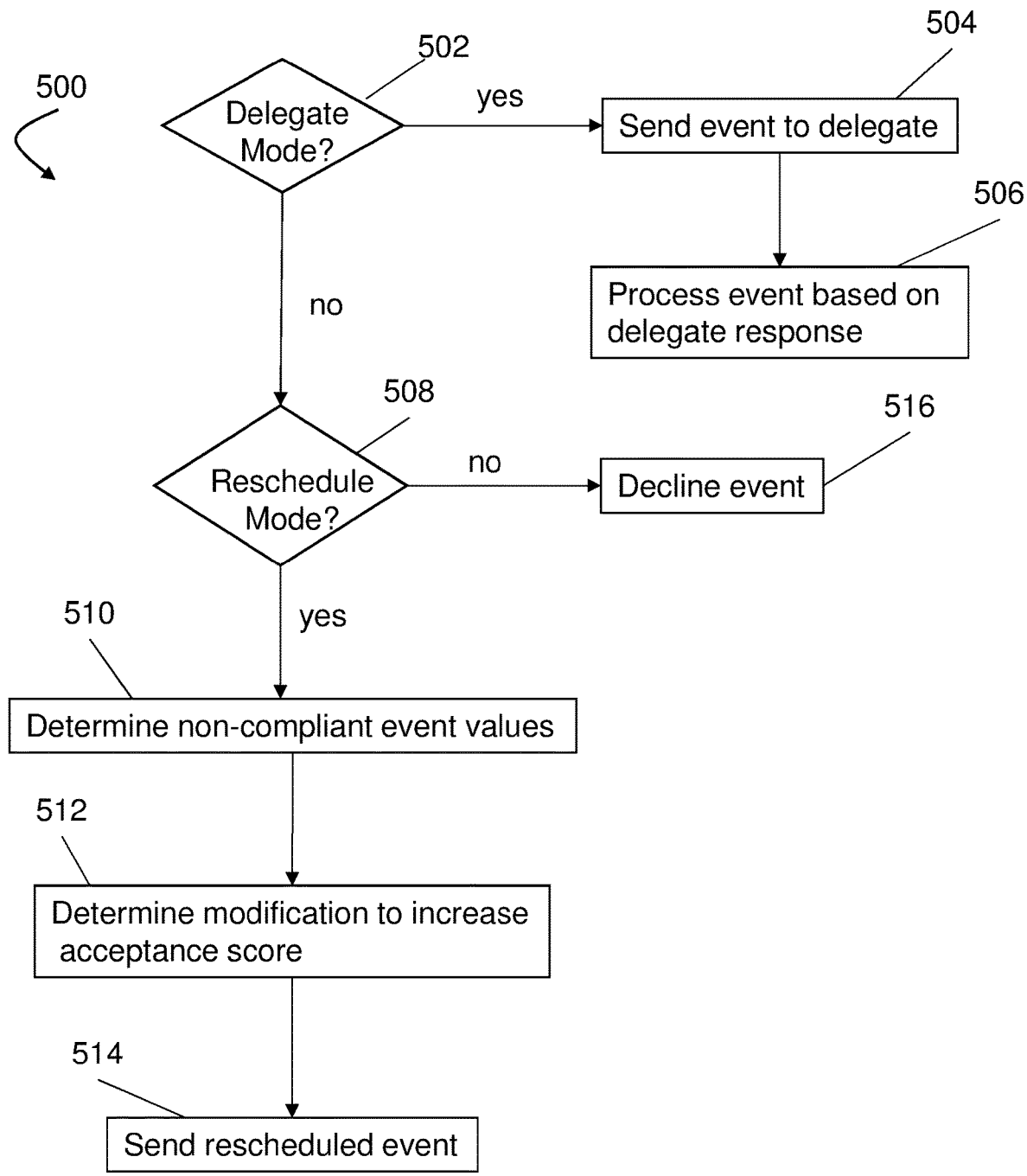
FIG. 5 is a flow chart depicting one embodiment of an example method of discarding a calendar event.

FIG. 5 is a flow chart of one embodiment of an example method 500 of discarding a calendar event. The method 500 is one example implementation of the discarding process of block 326 in method 300 and the discarding process of block 406 in method 400. The method 500 can be implemented by a calendar server, such as calendar server 102 or 202 described above. For example, the method 500 can be implemented by a CPU, such as CPU 205 in calendar server 202, executing instructions, such as smart planner instructions 210. It is to be understood that the order of actions in example method 500 is provided for purposes of explanation and that the method can be performed in a different order in other embodiments. Similarly, it is to be understood that some actions can be omitted or additional actions can be included in other embodiments.

At block 502, the calendar server determines if a delegate mode is enabled. For the delegate mode, the user identifies a person (referred to herein as a delegate) to which an event can be sent to make decisions when enabling the delegate mode. If the delegate mode is enabled, the calendar server sends the event to the delegate at block 504. Based on input received from the delegate, the calendar server accepts, declines or reschedules the event at block 506.

If the delegate mode is not enabled at block 502, the calendar server determines if a reschedule mode is enabled at block 508. In response to determining that the reschedule mode is enabled, the calendar server analyzes the discarded event at block 510 to determine which of the event values did not comply with or match the values of the user-defined criteria. For example, the calendar server determines if the time of the event was outside the user's preferred hours represented by the values of the user-defined time of day criteria, if the length of the meeting exceeded the maximum length, etc. At block 512, the calendar server determines modifications to the event values which will increase a computed acceptance score of the discarded event. For example, the calendar server can calculate adjustments to the event length, the event date, the start time of the event, etc. The adjustments are calculated so that, after taking into account the adjustments, the computed acceptance score is increased so that the computed acceptance score exceeds the first threshold which improves the probability that the event will be accepted.

In some embodiments, the calendar server calculates the adjustments by analyzing available time on the user's calendar within some time period of the original date in the event request, as discussed above. Additionally, in some embodiments, the adjustments can be calculated based on previous/historical decisions. For example, in some such embodiments, the calendar server analyzes criteria values for accepted and rejected criteria from a predetermined time window (e.g. the past 6 months) to determine which criteria values are most likely to be accepted. The calendar server then options from the available times which include criteria values that are most likely to be accepted. In some embodiments, the calendar server selects the option having the highest computed acceptance score. In other embodiments, the calendar server selects a plurality of options having the relative highest computed acceptance scores (e.g. the 3 options having the highest 3 computed acceptance scores). At block 514, the calendar server sends a respective rescheduled event for each of the selected options determined at block 512. The rescheduled events are sent to all people involved in the original event request. If the reschedule mode is not enabled at block 508, the calendar server declines the event at block 516.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, aspects of the system 100 discussed above can be implemented in a cloud computing environment. For example, the calendar server can be implemented via a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service. Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
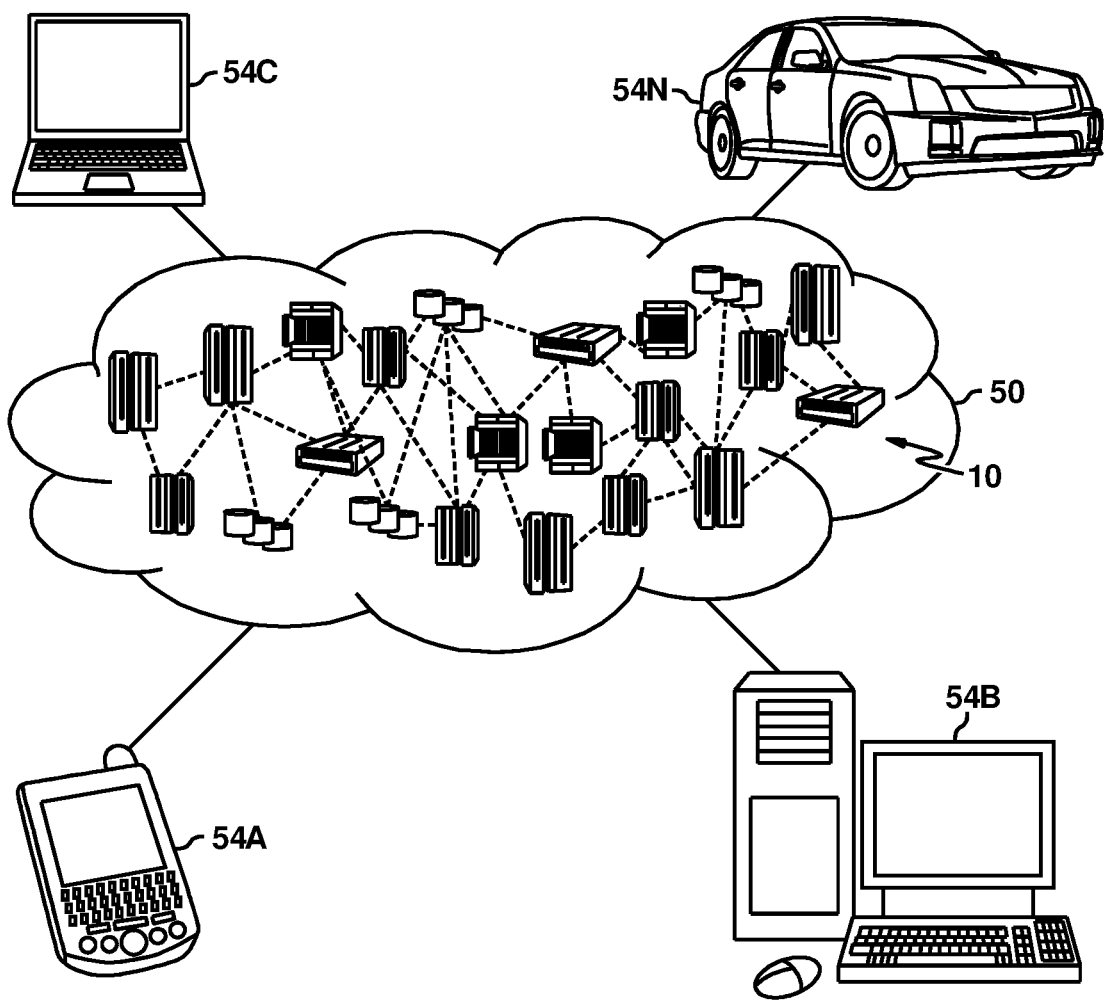
FIG. 6 depicts one embodiment of an example cloud computing environment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
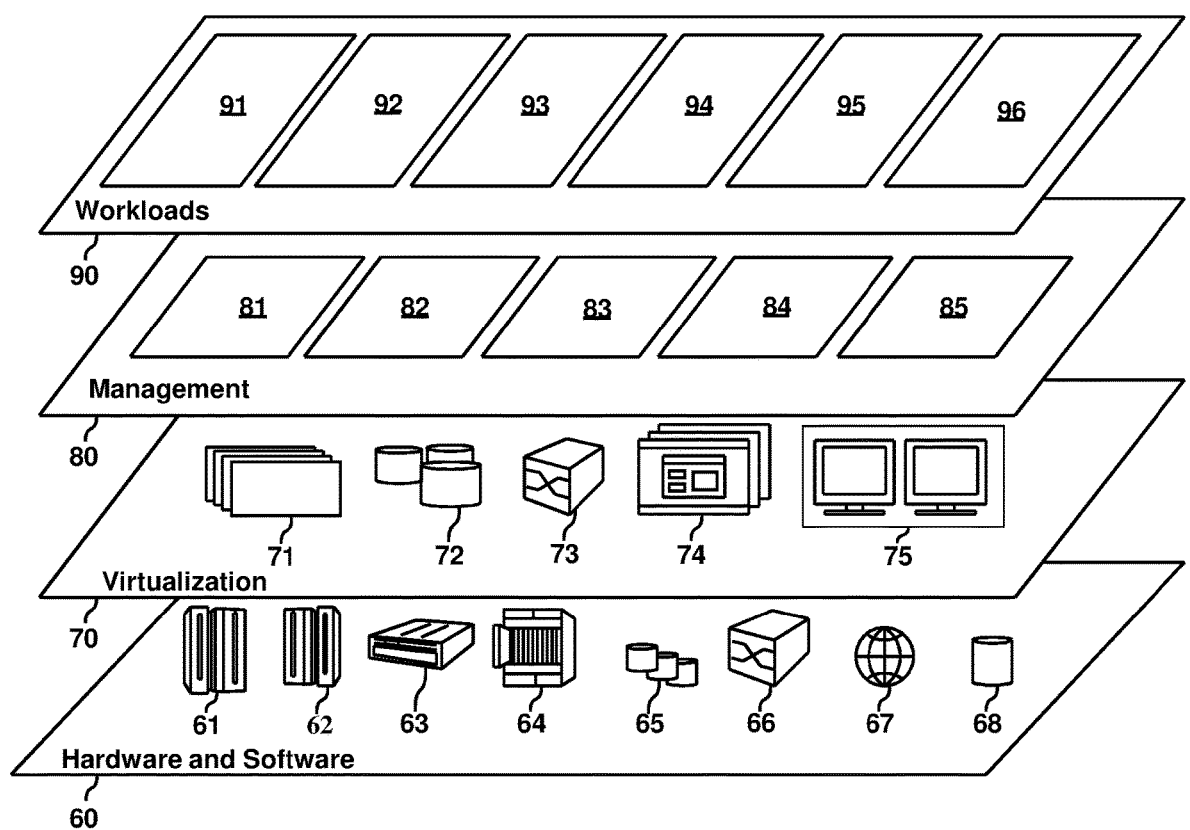
FIG. 7 depicts one embodiment of example abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calendar processing 96. Calendar processing 96 is configured to implement the functionality described above with respect to FIG. 3-5.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer implemented method of adapting to a user's decisions in order to automatically process new calendar events with the computer, the method comprising:
    receiving a new calendar event for the user's calendar via a network interface;
    extracting event information from the new calendar event, the event information corresponding to user-defined criteria, wherein each of the user-defined criteria is associated with a respective user-defined weight;
    comparing the extracted event information with user-defined values associated with the user-defined criteria;
    computing an acceptance score for the new calendar event based on the comparison of the extracted event information with the user-defined values and on the respective user-defined weights;
    comparing the acceptance score of the new calendar event to an acceptance score of a conflicting scheduled event on the user's calendar that conflicts with the new calendar event;
    prompting the user for input to select either the conflicting scheduled event or the new calendar event in response to determining that the acceptance score of the new calendar event is equal to the acceptance score of the conflicting scheduled event;
    identifying differences between the event information from the conflicting scheduled event and the event information from the new calendar event;
    automatically updating the user-defined values and the user-defined weights based on the identified differences in response to receiving user input that selects either the conflicting scheduled event or the new calendar event; and
    automatically resolving a conflict between a subsequent new calendar event and a second conflicting scheduled event based on the identified differences without prompting the user for input to select either the second conflicting scheduled event or the subsequent new calendar event.

2. The computer implemented method of claim 1, further comprising:
    receiving a second new calendar event for the user's calendar;
    extracting second event information from the second new calendar event, the second event information corresponding to the user-defined criteria;
    comparing the extracted second event information with the user-defined values;
    computing a second acceptance score for the second new calendar event based on the comparison of the extracted second event information with the user-defined values and on the respective user-defined weights;
    determining that the second new calendar event conflicts with a scheduled calendar event on the user's calendar;
    in response to determining that the second new calendar event conflicts with a scheduled calendar event on the user's calendar, comparing the second acceptance score to an acceptance score of the scheduled calendar event; and
    in response to determining that the second acceptance score is less than the acceptance score of the scheduled calendar event, discarding the second new calendar event.

3. The computer implemented of claim 1, further comprising:
    receiving a second new calendar event for the user's calendar;
    extracting second event information from the second new calendar event, the second event information corresponding to the user-defined criteria;
    comparing the extracted second event information with the user-defined values;
    computing a second acceptance score for the second new calendar event based on the comparison of the extracted second event information with the user-defined values and on the respective user-defined weights;
    determining that the second new calendar event conflicts with a scheduled calendar event on the user's calendar;
    in response to determining that the second new calendar event conflicts with a scheduled calendar event on the user's calendar, comparing the second acceptance score to an acceptance score of the scheduled calendar event; and
    in response to determining that the second acceptance score is greater than the acceptance score of the scheduled calendar event, discarding the scheduled calendar event and scheduling the second new calendar event.

4. The computer implemented method of claim 1, further comprising:
    receiving a second new calendar event for the user's calendar;
    extracting second event information from the second new calendar event, the second event information corresponding to the user-defined criteria;
comparing the extracted second event information with the user-defined values;
    computing a second acceptance score for the second new calendar event based on the comparison of the extracted second event information with the user-defined values and on the respective user-defined weights;

determining that the second new calendar event conflicts with a scheduled calendar event on the user's calendar;

in response to determining that the second new calendar event conflicts with a scheduled calendar event on the user's calendar, comparing the second acceptance score to an acceptance score of the scheduled calendar event;

in response to determining that the second acceptance score is equal to the acceptance score of the scheduled calendar event, prompting the user for input to select either the scheduled calendar event or the second new calendar event;

in response to receiving user input that selects either the scheduled calendar event or the second new calendar event, including the selected calendar event on the user's calendar and discarding the unselected event;

comparing event information from the selected calendar event with event information from the unselected calendar event to identify differences in the respective event information; and storing the identified differences for use in subsequent conflict resolution.

5. The computer implemented method of claim 1, further comprising:

receiving a second new calendar event for the user's calendar;

extracting second event information from the second new calendar event, the second event information corresponding to the user-defined criteria;

comparing the extracted second event information with the user-defined values;

computing a second acceptance score for the second new calendar event based on the comparison of the extracted second event information with the user-defined values and on the respective user-defined weights;

comparing the second acceptance score to a first user-defined threshold and to a second user-defined threshold;

in response to determining that the second acceptance score is between the first user-defined threshold and the second user-defined threshold, determining one or more suggested modifications to the second event information which can increase the second acceptance score;

outputting the one or more suggested modifications for display on a user device to request user input; and in response to receiving user input accepting at least one of the one or more suggested modifications, modifying the second new calendar event based on the at least one accepted modification and scheduling the modified second new calendar event.

6. The computer implemented method of claim 5, further comprising:

storing event information from the modified second new calendar event;

analyzing the stored event information to determine when to update the user-defined weights or the user-defined values; and upon determining when to update the user-defined weights or the user-defined values, updating the user-defined weights or the user-defined values based on the stored event information.

7. The computer implemented method of claim 1, further comprising:

receiving a second new calendar event for the user's calendar;

extracting second event information from the second new calendar event, the second event information corresponding to the user-defined criteria;

comparing the extracted second event information with the user-defined values;

computing a second acceptance score for the second new calendar event based on the comparison of the extracted second event information with the user-defined values and on the respective user-defined weights;

comparing the second acceptance score to a first user-defined threshold and to a second user-defined threshold; and in response to determining that the second acceptance score is below the second user-defined threshold, discarding the second new calendar event.

8. The computer implemented method of claim 7, wherein discarding the second new calendar event comprises:

determining which values of the second event information do not match the user-defined values;

determining one or more suggested modifications to the values of the second event information that do not match the user-defined values, wherein the suggested modifications can increase the second acceptance score; and sending a rescheduled second new calendar event, the rescheduled second new calendar event including the one or more suggested modifications.

9. A calendar server comprising:

a network interface communicatively coupled to a respective network interface of one or more user devices;

a storage device configured to store user personalized parameters, the user personalized parameters including a plurality of user-defined weights and a plurality of user-defined values, each of the user-defined values associated with a respective one of a plurality of criteria and each user-defined weight associated with a respective one of the plurality of criteria; and a processor communicatively coupled to the network interface and to the storage device, wherein the processor is configured to extract event information for a new calendar event request received via the network interface, wherein the event information includes values associated with one or more of the plurality of criteria;

wherein the processor is further configured to compare the values of the extracted event information with the plurality of user-defined values stored in the storage device and to compute an acceptance score for the new calendar event request based on the comparison of the values of the extracted event information with the plurality of user-defined values and on the plurality of user-defined weights; and wherein the processor is further configured to compare the acceptance score of the new calendar event to an acceptance score of a conflicting scheduled event on the user's calendar that conflicts with the new calendar event;

wherein the processor is further configured to:

prompt the user for input to select either the conflicting scheduled event or the new calendar event in response to determining that the acceptance score of the new calendar event is equal to the acceptance score of the conflicting scheduled event;

identify differences between the event information from the conflicting scheduled event and the event information from the new calendar event;

automatically update the plurality of user-defined values and the plurality of user-defined weights based on the identified differences in response to receiving user input that selects either the conflicting scheduled event or the new calendar event; and automatically resolve a conflict between a subsequent new calendar event and a second conflicting scheduled event based on the identified differences without prompting the user for input to select either the second conflicting scheduled event or the subsequent new calendar event.

10. The calendar server of claim 9, wherein the processor is further configured to extract second event information for a second new calendar event request received via the network interface, wherein the second event information includes values associated with one or more of the plurality of criteria;

wherein the processor is further configured to compare the values of the extracted second event information with the plurality of user-defined values stored in the storage device and to compute a second acceptance score for the second new calendar event request based on the comparison of the values of the extracted second event information with the plurality of user-defined values and on the plurality of user-defined weights;

wherein the processor is further configured to determine that the second new calendar event request conflicts with a scheduled calendar event and, in response to determining that the second new calendar event request conflicts with a scheduled calendar event, to compare the second acceptance score to an acceptance score of the scheduled calendar event; and wherein, in response to determining that the second acceptance score is greater than the acceptance score of the scheduled calendar event, the processor is further configured to discard the scheduled calendar event and to schedule the second new calendar event request.

11. The calendar server of claim 9, wherein the processor is further configured to extract second event information for a second new calendar event request received via the network interface, wherein the second event information includes values associated with one or more of the plurality of criteria;

wherein the processor is further configured to compare the values of the extracted second event information with the plurality of user-defined values stored in the storage device and to compute a second acceptance score for the second new calendar event request based on the comparison of the values of the extracted second event information with the plurality of user-defined values and on the plurality of user-defined weights;

wherein the processor is further configured to determine that the second new calendar event request conflicts with a scheduled calendar event and, in response to determining that the second new calendar event request conflicts with a scheduled calendar event, to compare the second acceptance score to an acceptance score of the scheduled calendar event;

wherein, in response to determining that the second acceptance score is equal to the acceptance score of the scheduled calendar event, the processor is configured to prompt the user for input to select either the scheduled calendar event or the second new calendar event request;

wherein the processor is configured to receive, via the network interface, user input selecting either the scheduled calendar event or the second new calendar event request and, in response to receiving the user input, the processor is configured to schedule the selected calendar event and discard the unselected event;

wherein the processor is further configured to compare event information from the selected calendar event with event information from the unselected calendar event to identify differences in the respective event information; and wherein the processor is configured to store the identified differences on the storage device for use in subsequent conflict resolution.

12. The calendar server of claim 9, wherein the processor is configured to extract second event information for a second new calendar event request received via the network interface, wherein the second event information includes values associated with one or more of the plurality of criteria;

wherein the processor is further configured to compare the values of the extracted second event information with the plurality of user-defined values stored in the storage device and to compute a second acceptance score for the second new calendar event request based on the comparison of the values of the extracted second event information with the plurality of user-defined values and on the plurality of user-defined weights;

wherein the processor is further configured to compare the second acceptance score to a first user-defined threshold and to a second user-defined threshold and, in response to determining that the second acceptance score is between the first user-defined threshold and the second user-defined threshold, to determine one or more suggested modifications to the second event information which can increase the second acceptance score;

wherein the processor is configured to output the one or more suggested modifications via the network interface for display on one of the one or more user devices and to receive user input accepting at least one of the one or more suggested modifications; and wherein the processor is configured to modify the second new calendar event request based on the at least one accepted modification and to schedule the modified second new calendar event request.

13. The calendar server of claim 12, wherein the processor is further configured to store event information from the modified second new calendar event request, to analyze the stored event information to determine when to update the user-defined weights or the user-defined values, and upon determining when to update the user-defined weights or the user-defined values, to automatically update the user-defined weights or the user-defined values based on the stored event information.

14. The calendar server of claim 9, wherein the processor is further configured to extract second event information for a second new calendar event request received via the network interface, wherein the second event information includes values associated with one or more of the plurality of criteria;

wherein the processor is further configured to compare the values of the extracted second event information with the plurality of user-defined values stored in the storage device and to compute a second acceptance score for the second new calendar event request based on the comparison of the values of the extracted second event information with the plurality of user-defined values and on the plurality of user-defined weights;

wherein the processor is further configured to compare the second acceptance score to a first user-defined threshold and to a second user-defined threshold;
wherein, in response to determining that the second acceptance score is below the second user-defined threshold, the processor is configured to:
determine which values of the second event information do not comply with the plurality of user-defined values;
determine one or more suggested modifications to the values of the second event information that do not comply with the plurality of user-defined values, wherein the suggested modifications can increase the second acceptance score; and
send a rescheduled second new calendar event request, the rescheduled second new calendar event request including the one or more suggested modifications.

15. A computer program product comprising a computer readable storage medium having a computer readable program stored therein, wherein the computer readable program, when executed by a processor, causes the processor to:
extract event information for a new calendar event request, wherein the event information includes values associated with one or more of a plurality of criteria, each of the plurality of criteria associated with a respective one of a plurality of user-defined weights;
compare the values of the extracted event information with a plurality of user-defined values, each of the user-defined values associated with a respective one of the plurality of criteria;
compute an acceptance score for the new calendar event request based on the comparison of the values of the extracted event information with the plurality of user-defined values and on the plurality of user-defined weights;
compare the acceptance score of the new calendar event to an acceptance score of a conflicting scheduled event on the user's calendar that conflicts with the new calendar event;
prompt the user for input to select either the conflicting scheduled event or the new calendar event in response to determining that the acceptance score of the new calendar event is equal to the acceptance score of the conflicting scheduled event;
identify differences between the event information from the conflicting scheduled event and the event information from the new calendar event;
automatically update the user-defined values and the user-defined weights based on the identified differences in response to receiving user input that selects either the conflicting scheduled event or the new calendar event; and
automatically resolve a conflict between a subsequent new calendar event and a second conflicting scheduled event based on the identified differences without prompting the user for input to select either the second conflicting scheduled event or the subsequent new calendar event.

16. The computer program product of claim 15, wherein the computer readable program is further configured to cause the processor to:
extract second event information for a second new calendar event request, wherein the second event information includes values associated with one or more of the plurality of criteria;
compare the values of the extracted second event information with the plurality of user-defined values;
compute a second acceptance score for the second new calendar event request based on the comparison of the values of the extracted second event information with the plurality of user-defined values and on the plurality of user-defined weights;
compare the second acceptance score to an acceptance score of a scheduled calendar event in response to determining that the second new calendar event request conflicts with the scheduled calendar event; and
discard the scheduled calendar event and schedule the second new calendar event request, in response to determining that the second acceptance score is greater than the acceptance score of the scheduled calendar event.

17. The computer program product of claim 15, wherein the computer readable program is further configured to cause the processor to:
extract second event information for a second new calendar event request, wherein the second event information includes values associated with one or more of the plurality of criteria;
compare the values of the extracted second event information with the plurality of user-defined values;
compute a second acceptance score for the second new calendar event request based on the comparison of the values of the extracted second event information with the plurality of user-defined values and on the plurality of user-defined weights;
compare the second acceptance score to an acceptance score of a scheduled calendar event in response to determining that the second new calendar event request conflicts with the scheduled calendar event;
output a prompt to request user input to select either the scheduled calendar event or the second new calendar event request, in response to determining that the second acceptance score is equal to the acceptance score of the scheduled calendar event;
receive user input selecting one of the scheduled calendar event or the second new calendar event request;
schedule the selected calendar event and discard the unselected calendar event, in response to receiving the user input;
compare event information from the selected calendar event with event information from the unselected calendar event to identify differences in the respective event information; and
store the identified differences for use in subsequent conflict resolution.

18. The computer program product of claim 15, wherein the computer readable program is further configured to cause the processor to:
extract second event information for a second new calendar event request, wherein the second event information includes values associated with one or more of the plurality of criteria;
compare the values of the extracted second event information with the plurality of user-defined values;
compute a second acceptance score for the second new calendar event request based on the comparison of the values of the extracted second event information with the plurality of user-defined values and on the plurality of user-defined weights;
compare the second acceptance score to a first user-defined threshold and to a second user-defined threshold;
determine one or more suggested modifications to the second event information which can increase the second acceptance score, in response to determining that the second acceptance score is between the first user-defined threshold and the second user-defined threshold;

output the one or more suggested modifications with a request for user input;

receive user input accepting at least one of the one or more suggested modifications;

modify the second new calendar event request based on the at least one accepted modification; and schedule the modified second new calendar event request.

19. The computer readable program of claim 18, wherein the computer readable program is further configured to cause the processor to:

store event information from the modified second new calendar event request;

analyze the stored event information to determine when to update the user-defined weights or the user-defined values; and upon determining when to update the user-defined weights or the user-defined values, automatically update the user-defined weights or the user-defined values based on the stored event information.

20. The computer readable program of claim 15, wherein the computer readable program is further configured to cause the processor to:

extract second event information for a second new calendar event request, wherein the second event information includes values associated with one or more of the plurality of criteria;

compare the values of the extracted second event information with the plurality of user-defined values;

compute a second acceptance score for the second new calendar event request based on the comparison of the values of the extracted second event information with the plurality of user-defined values and on the plurality of user-defined weights;

compare the second acceptance score to a first user-defined threshold and to a second user-defined threshold;

wherein, in response to determining that the second acceptance score is below the second user-defined threshold, the computer readable program is further configured to cause the processor to:

determine which values of the second event information do not comply with the plurality of user-defined values;

determine one or more suggested modifications to the values of the second event information that do not comply with the plurality of user-defined values, wherein the suggested modifications can increase the second acceptance score; and send a rescheduled second new calendar event request, the rescheduled second new calendar event request including the one or more suggested modifications.

* * * * *